United States Patent [19]

Gregory et al.

[11] Patent Number: 5,779,781
[45] Date of Patent: Jul. 14, 1998

[54] INK AND TONER COMPOSITIONS CONTAINING SUBSTITUTED PHENYL AZO THIOPHENE DYE

[75] Inventors: Peter Gregory; Alan Thomas Leaver, both of Manchester, United Kingdom

[73] Assignee: Zeneca Limited, London, England

[21] Appl. No.: 831,934

[22] Filed: Apr. 2, 1997

[30] Foreign Application Priority Data

Apr. 25, 1996 [GB] United Kingdom ................ 9608489

[51] Int. Cl.$^6$ .............................................. C09D 11/02
[52] U.S. Cl. ............................ 106/31.51; 427/394
[58] Field of Search .......................... 106/31.51; 427/394

[56] References Cited

U.S. PATENT DOCUMENTS

| | | | |
|---|---|---|---|
| 4,207,067 | 6/1980 | Becker | 106/31.51 |
| 4,212,642 | 7/1980 | Della Casa et al. | 106/31.51 |
| 4,401,692 | 8/1983 | Schickfluss et al. | 106/31.51 |
| 4,422,854 | 12/1983 | Hahnle et al. | 106/31.51 |
| 5,389,596 | 2/1995 | Etzbach et al. | 106/31.48 |

FOREIGN PATENT DOCUMENTS

| | | | |
|---|---|---|---|
| 0 297 710 A1 | 1/1989 | European Pat. Off. | C09B 29/033 |
| 0 347 685 A2 | 12/1989 | European Pat. Off. | C09B 67/22 |
| 0 347 685 A3 | 12/1989 | European Pat. Off. | C09B 67/22 |
| 0 392 358 A1 | 10/1990 | European Pat. Off. | C09B 67/22 |
| 0 588 489 A1 | 3/1994 | European Pat. Off. | C09B 29/033 |
| 0 671 440 A2 | 9/1995 | European Pat. Off. | |
| 23 04 203 | 8/1973 | Germany | C09B 29/033 |
| 55-92766 A | 7/1980 | Japan | C09B 29/08 |
| 55-118964 A | 9/1980 | Japan | C09B 29/08 |
| 1 394 365 | 5/1975 | United Kingdom | C09B 29/00 |
| WO 83/02452 | 7/1983 | WIPO | C08B 29/033 |
| WO 97/04030 | 2/1997 | WIPO | C09B 29/033 |

OTHER PUBLICATIONS

Chemical Abstracts, vol. 94, No. 10, Oct. 3, 1981, Mitsubishi Chemical Co. Ltd.
Chemical Abstracts, vol. 94, No. 1, May 1, 1981, Mitsubishi Chemical Co. Ltd.

*Primary Examiner*—Helene Klemanski
*Attorney, Agent, or Firm*—Pillsbury Madison & Sutro LLP

[57] ABSTRACT

An ink composition comprising:
(i) a medium comprising a low melting point solid, an organic solvent, or a mixture of water and one or more water-soluble organic solvent(s); and
(ii) an azothiophene of Formula (1):

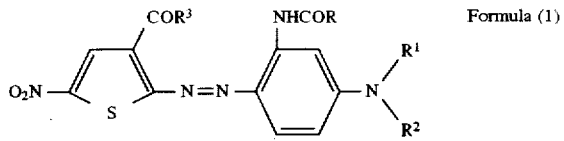

wherein:
R, $R^1$, $R^2$ and $R^3$ each independently is optionally substituted alkyl or alkenyl.

Also claimed are inks containing mixtures of the azothiophene of Formula (1) with other azothiophenes and with azo dyes, a process for ink jet printing of textiles using the inks, a process for ink jet printing a substrate with the inks and toner resin composition containing an azothiophene of Formula (1).

13 Claims, No Drawings

INK AND TONER COMPOSITIONS CONTAINING SUBSTITUTED PHENYL AZO THIOPHENE DYE

The present invention relates to compositions and solutions thereof, suitable for use in printing and imaging technologies, especially those suitable for coloration of substrates such as paper, plastics, textiles, metal and glass by printing processes such as ink jet printing and those suitable for use in electrophotography such as toners.

Ink jet printing is a non-impact printing technique which involves ejecting, thermally or by action of an oscillating piezo crystal, droplets of ink continuously or on demand from a fine nozzle directly onto a substrate such as paper, plastics, textile, metal or glass. The ink may be aqueous, solvent or hot melt based and must provide sharp, non-feathered images which have good waterfastness, light fastness and optical density, have fast fixation to the substrate and cause no clogging of the nozzle.

Electrophotographic copiers or printers generally comprise an organic photoconductor (OPC) and a developer or toner. The OPC generally comprises an electrically conducting support, a charge generating layer and a charge transport layer. The electrically conducting support is a metal drum, typically an aluminium drum, or a metallised polymer film, typically aluminised polyester. The charge generating layer comprises a charge generating material (CGM) and a binder resin, typically a polycarbonate. The charge transport later comprises a charge transport material (CTM) and a binder resin, typically a polycarbonate. The developer or toner comprises a toner resin, a colorant and optionally a charge control agent (CCA). The toner resin is typically a styrene or substituted styrene polymer or styrene-butadiene copolymer. The colorant is typically a dye or pigment or mixture thereof.

According to a first aspect of the present invention there is provided an ink composition comprising:
(i) an azothiophene of Formula (b 1):

Formula (1)

wherein:
R, R$^1$, R$^2$ and R$^3$ each independently is optionally substituted alkyl or alkenyl; and
(ii) a medium comprising a low melting point solid, an organic solvent, or a mixture of water and one or more water-soluble organic solvent(s). The alkyl groups represented by R, R$^1$, R$^2$ and R$^3$ are preferably C$_{1-12}$-alkyl, more preferably C$_{1-6}$-alkyl and especially C$_{1-4}$-alkyl each of which is optionally substituted. The alkyl groups represented by R, R$^1$, R$^2$ and R$^3$ may be straight or branched chain alkyl groups. The alkenyl groups represented by R, R$^1$, R$^2$ and R$^3$ are preferably C$_{2-12}$-alkenyl, more preferably C$_{2-6}$-alkenyl and especially C$_{2-3}$-alkenyl each of which is optionally substituted.

When any of the groups R, R$^1$,R$^2$ and R$^3$ are optionally substituted, preferred substituents are selected from —OH, C$_{1-4}$-alkoxy, —CN, phenyl, C$_{1-4}$-alkylCO—, C$_{1-4}$-alkoxyC(O)O—, C$_{1-4-alkoxyCO—}$, $_{HOC1-4}$-alkoxyCO— and phenyl substituted by—OH, —NH$_2$ or —NO$_2$.

Preferred azothiophene dyes of Formula (b 1) are those in which R$^1$ and R$^2$ each independently is C$_{1-4}$-alkyl or C$_{2-3}$-alkenyl and R and R$^3$ each independently is C$_{1-4}$-alkyl. An especially preferred azothiophene of Formula (1) is that in which R$^1$ and R$^2$ are both ethyl and R and R$^3$ are both methyl.

The dyes of Formula (1) may be prepared by diazotising a 2-aminothiophene of Formula (2):

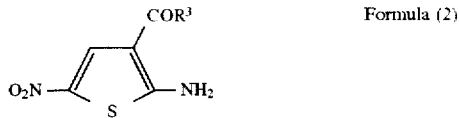

Formula (2)

and coupling with an aromatic amine of Formula (3):

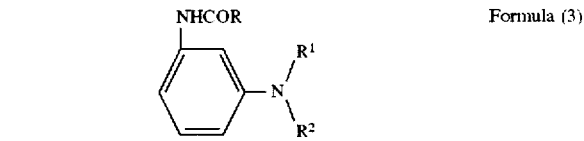

Formula (3)

wherein:
R, R$_1$, R$_2$ and R$^3$ are as hereinbefore defined. The diazotisation and coupling may be performed by conventionally used methods and the azothiophenes may be isolated using known techniques.

The azothiophenes of Formula (1) exist in various crystalline modifications and it is intended that the present definition of the azothiophenes includes such crystalline modifications which may be formed by established treatments such as heat treatment, solvent treatment, recrystallisation or seeding.

According to a second aspect of the present invention there is provided an ink composition comprising:
(i) a medium comprising a low melting point solid, an organic solvent, or a mixture of water and one or more water-soluble organic solvent(s); and
(ii) a mixture of dyes comprising an azothiophene of Formula (b 1) and an azothiophene of Formula (4):

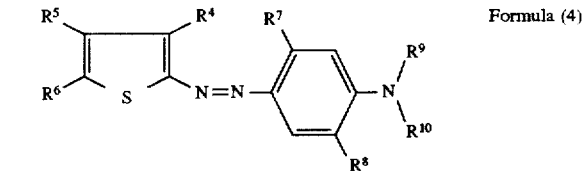

Formula (4)

wherein:
R$^4$ is —CN, —Cl, —Br, —NO$_2$, C$_{1-4}$-alkylcarbonyl, phenylcarbonyl, C$_{1-4}$-alkylsulphonyl, —COC$_{1-4}$-alkyl, —CONH$_2$, —CONH (C$_{1-4}$-alkyl) or —CON(C$_{1-4}$-alkyl)$_2$;

R$^5$ is —H, C$_{1-4}$-alkyl, phenyl or —COC$_{1-4}$-alkyl;

R$^6$ is —H, C$_{1-4}$-alkyl, phenyl, NO$_2$, —CN, —Cl, —Br, —COC$_{1-4}$-alkyl, —CONH$_2$, —CONH(C$_{1-4}$-alkyl) or —CON(C$_{1-4}$-alkyl)$_2$;

R$^7$ is —H, C$_{1-4}$-alkyl, C$_{1-4}$—Cl, —Br, —NHCOC$_{1-4}$-alkyl or —NHSO$_2$C$_{1-4}$-alkyl;

R$^8$ is —H, C$_{1-4}$-alkyl or C$_{1-4}$-alkoxy; and

R$^9$ and R$^{10}$ each independently is —H, C$_{1-4}$-alkyl, C$_{2-4}$-alkenyl or C$_{1-4}$-alkyl substituted by —OH, C$_{1-4}$-alkoxy, —CN, phenyl, C$_{1-4}$-alkylCO—, C$_{1-4}$-alkoxyCO—, HOC$_{1-4}$-alkoxy-C$_{1-4}$-alkoxy-C$_{1-4}$-alkoxy, C$_{1-4}$-alkoxy-C$_{1-4}$-alkoxyCO—, —Cl or C$_{1-4}$-alkoxyCOO.

Preferred dyes of Formula (b 4) are those in which R$^4$ is —NO$_2$, —CN or C$_{1-4}$-alkylcarbonyl, R$^5$ is —H or C$_{1-4}$alkyl, R$^6$ is —NO$_2$ or —CN, R$^7$ is C$_{1-4}$-alkyl or —NHCOC$_{1-4}$-alkyl, R$^8$ is —H or C$_{1-4}$-alkoxy, R$^9$ and R$^{10}$ each independently is C$_{1-4}$-alkyl. Especially preferred dyes of Formula (4) are those in which R$^4$ is —NO$_2$, R$^5$ is —H, R$^6$ is —NO$_2$, R$^7$ is —CH$_3$, —C$_2$H$_5$, —NHCOCH$_3$, —NHCOC$_2$H$_5$, —NHCOC$_3$H$_7$ or —NHCOCH(CH$_3$)$_3$, R$^8$ is —H or —OCH$_3$ and R$^9$ and R$^{10}$ are both —C$_2$H$_5$.

The dye mixtures may be prepared as physical mixtures, by co-crystallisation or co-synthesis.

Mixtures of dyes of Formulae (1) and (4) preferably comprise from 30% to 70% of a dye of Formula (1), and from 70% to 30% of a dye of Formula (4), more preferably from 40% to 60% of a dye of Formula (1) and from 60% to 40% of a dye of Formula (4) and especially from 45% to 55% of a dye of Formula (1) and from 55% to 45% of a dye of Formula (4).

According to a third aspect of the present invention there is provided an ink composition comprising:
(i) a medium comprising a low melting point solid, an organic solvent, or a mixture of water and one or more water-soluble organic solvent(s); and
(ii) a mixture of dyes comprising an azothiophene of Formula (1) and an azo compound of Formula (5):

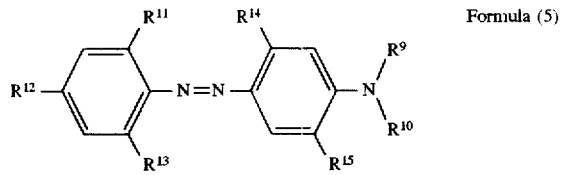

Formula (5)

wherein:

$R^{11}$, $R^{12}$ and $R^{13}$ each independently is —CN, —NO$_2$, —Cl or —Br;

$R^{14}$ is —H, $C_{1-4}$-alkyl, —Cl, —Br, —NHCOC$_{1-4}$-alkyl or -NHSO$_2$C$_{1-4}$-alkyl;

$R^{15}$ is —H, $C_{1-4}$-alkyl or $C_{1-4}$-alkoxy; and $R^9$ and $R^{10}$ are as hereinbefore defined.

A first preferred dye of Formula (5) is that in which $R^{11}$ and $R^{13}$ are —CN, $R^{12}$ is —NO$_2$, $R^{14}$ is —CH$_3$, $R^{15}$ is —H and $R^9$ and $R^{10}$ are both —C$_2$H$_5$.

A second preferred dye of Formula (5) is that in which $R^{11}$ is —CN, $R^{12}$ is —NO$_2$, $R_{13}$ is —Br, $R^{14}$ is —NHCOCH$_3$, $R^{15}$ is —H and $R^9$ and $R^{10}$ are both —C$_2$H$_5$.

Mixtures of dyes of Formula (1) and (5) preferably comprise from 5% to 50% of a dye of Formula (1) and from 95% to 50% of a dye of Formula (5), more preferably from 10% to 45% of a dye of Formula (1) and from 90% to 55% of a dye of Formula (5).

A first preferred mixture of dyes comprise from 5% to 15% a dye of Formula (1) in which $R^1$ and $R^2$ each independently is $C_{1-4}$-alkyl preferably methyl or ethyl, or $C_{2-3}$alkenyl and R and $R^3$ each independently is $C_{1-4}$-alkyl preferably methyl or ethyl, and from 95% to 85% of a dye of Formula (5) in which $R^{11}$ is —CN, $R^{12}$ is —NO$_2$, $R^{13}$ is —Br, $R^{14}$ is —NHCOCH$_3$, $R^{15}$ is —H and $R^9$ and $R^{10}$ are both —C$_2$H$_5$.

A second preferred mixture of dyes comprises from 35% to 45% of a dye of Formula (1) in which $R^1$ and $R^2$ each independently is $C_{1-4}$-alkyl preferably methyl or ethyl, or $C_{2-3}$-alkenyl and R and $R^3$ each independently is $C_{1-4}$-alkyl preferably methyl or ethyl, and from 65% to 55% of a dye of Formula (5) in which $R^{11}$ and $R^{13}$ are —CN, $R^{12}$ is —NO$_2$, $R^{14}$ is —CH$_3$, $R^{15}$ is —H and $R^9$ and $R^{10}$ are both —C$_2$H$_5$.

The ink compositions of the present invention preferably contain from 0.5% to 20%, more preferably from 0.5% to 15%, and especially from 1% to 3%, by weight of the dye of Formula (1) or mixtures of dyes of Formulae (1) and (4) or mixture of dyes of Formulae (1) and (5) based on the total weight of the ink.

The medium for the ink compositions of the first, second and third aspects of the present invention may be a liquid or a low melting point solid. Liquid media are preferably a mixture of water and one or more water-soluble organic solvent(s), or an organic solvent. Aqueous-based ink compositions are generally used in office or home printers whereas solvent based ink compositions find use in industrial continuous printers.

It is preferred that the dye of Formula (1) and the mixtures of dyes of Formulae (1) and (4) and of Formulae (1) and (5) are finely dispersed in the medium, or more preferably are dissolved completely in the medium to form a solution.

Where the liquid medium comprises a mixture of water and one or more water-soluble organic solvent(s), it is preferred that the weight ratio of water to water-soluble organic solvent(s) is from 99:1 to 1:99, more preferably from 99:1 to 50:50 and especially from 95:5 to 80:20. The water-soluble organic solvent(s) is preferably selected from $C_{1-4}$-alkanols, for example methanol, ethanol, n-propanol, isopropanol, n-butanol, sec-butanol, tert-butanol and isobutanol; cyclic alkanols, for example cyclohexanol and cyclopentanol; amides, for example dimethylformamide and dimethylacetamide; ketones or ketone-alcohols, for example acetone and diacetone alcohol; ethers, for example tetrahydrofuran and dioxane; oligo- or poly-alkyleneglycols, for example diethylene glycol, triethylene glycol, polyethylene glycol and polypropylene glycol; alkyleneglycols or thioglycols containing a $C_2$-$C_6$-alkylene group, for example ethylene glycol, propylene glycol, butylene glycol, pentylene glycol, hexylene glycol and thiodiglycol; polyols, for example glycerol and 1,2,6-hexanetriol; $C_{1-4}$-alkyl-ethers of polyhydric alcohols, for example 2-(2-methoxyethoxy) ethanol, 2-(2-ethoxyethoxy)-ethanol, 2-[2-(2-methoxyethoxy)ethoxy]ethanol and 2-[2-(2-ethoxyethoxy)-ethoxy]-ethanol; heterocyclic ketones, for example 2-pyrrolidone and N-methyl-2-pyrrolidone; or mixtures containing two or more of the aforementioned water-soluble organic solvents, for example thiodiglycol and a second glycol or diethylene glycol and 2-pyrrolidone.

Preferred water-soluble organic solvents are 2-pyrrolidone; N-methyl-pyrrolidone;

alkylene- and oligo-alkylene-glycols, for example ethyleneglycol, diethyleneglycol, triethyleneglycol; and lower alkyl ethers of polyhydric alcohols such as or 2-methoxy-2-ethoxy 2-ethoxyethanol; and polyethyleneglycols with a molecular weight of up to 500. A preferred specific solvent mixture is a binary or ternary mixture of water and diethylene glycol and/or, 2-pyrrolidone or N-methylpyrrolidone in weight ratios 75–95:25–5 and 60–80:0–20:0–20 respectively.

When the medium comprises a mixture of water and one or more water-soluble organic solvent(s), it preferably also contains humectant to inhibit evaporation of water and preservative to inhibit the growth of fungi, bacteria and/or algae in the solution. Examples of suitable humectants are, propan-1,2-diol, butan-1,2-diol, butan-2,3-diol and butan-1,3-diol, urea, caprolactam and polyethylene glycols.

When the medium comprises water and one or more water-soluble organic solvent(s) it preferably contains a dispersing agent and a defoamer.

Suitable dispersing agents include for example, lignosulphonates, a naphthalene, sulphonic acid/formaldehyde condensate and a phenol/cresol/sulphanilic acid/formaldehyde condensate. The dispersing agent is preferably present at from 0.05 to 20%, based upon the total weight of the ink composition.

Suitable defoamers include, for example, nonanol and silicon based mineral oils. The defoamer is preferably present at from 0.05 to 20% based upon the total weight of the ink composition.

In view of the foregoing preferences a preferred ink composition comprises
(a) 0.5 to 20 parts of the dye or the mixture of dyes;
(b) 2 to 60 parts of water-soluble organic solvent(s);
(c) 1 to 95 parts water;
(d) 0.5 to 20 parts dispersing agent; and
(e) 0.05 to 2 parts defoamer;
wherein the parts (a)+(b)+(c)+(d)+(e)=100.

In addition to the parts (a) to (e) the ink may contain other components conventionally use ink jet ink formulations such as a biocide, surfactants, viscosity modifiers, corrosions inhibitors and kogation reducing additives.

Examples of further suitable ink media are given in U.S. Pat. No. 4,963,189, U.S. Pat. No. 4,703,113, U.S. Pat. No. 4,626,284 and EP 4,251.50A which are incorporated herein by reference thereto.

When the liquid medium comprises an organic solvent, the solvent is preferably selected from ketones, alkanols, aliphatic hydrocarbons, esters, ethers, amides or mixtures thereof. Where an aliphatic hydrocarbon is used as the solvent a polar solvent such as an alcohol, ester, ether or amide is preferably added. Preferred solvents include ketones, especially methyl ethyl ketone and alkanols especially ethanol and n-propanol.

When the liquid medium is an organic solvent it is preferred that the dye has a solubility of around 10% or more to allow the preparation of concentrates which may be used to prepare more dilute inks and to minimise the chance of precipitation of dye if evaporation of the liquid medium occurs during use of the ink.

Solvent based ink compositions are used where fast drying times are required and particularly when printing onto hydrophobic substrates such as plastics, metal or glass.

When the medium for the ink composition comprises a low melting point solid the melting point of the solid is preferably in the range from 60° C. to 125° C. Suitable low melting point solids include long chain fatty acids and alcohols, preferably those with $C_{18-24}$ chains, or sulphonamides. The dye of Formula (1) or mixtures of dyes of Formulae (1) and (4) or mixture of dyes of Formulae (1) and (5) may be dissolved in the low melting point solid or may be finely dispersed in it.

It is preferred that the medium is a liquid medium, more preferably a mixture of water and one or more water-soluble organic solvent(s).

It is preferred that the pH of the ink composition is less than 7, more preferably in the range from 2 to 6.5 and especially from 4 to 6.

According to a fourth aspect of the present invention there is provided a process for printing a substrate with an ink composition using an ink jet printer, characterised in that the ink composition is as hereinbefore defined for the first, second or third aspects of the present invention.

A suitable process for the application of an ink composition as hereinbefore described comprises forming the ink into small droplets by ejection from a reservoir through a small orifice so that the droplets of ink are directed at a substrate. This process is commonly referred to as ink jet printing, and preferred ink jet printing processes for the present inks are piezoelectric ink jet printing and thermal ink jet printing. In thermal ink jet printing, programmed pulses of heat are applied to the ink in the reservoir by means of a resistor adjacent to the orifice, during relative movement between the substrate and the reservoir.

The substrate used in the ink jet printing process is preferably paper, a plastic, a textile material, metal or glass and is more preferably paper, plastic or a textile material.

Preferred textile materials are natural, semi-synthetic or synthetic material. Examples of natural textile materials include wool, silk, hair and cellulosic materials, particularly cotton, jute, hemp, flax and linen. Examples of synthetic and semi-synthetic materials include polyamides, polyesters, polyacrylonitriles and polyurethanes.

Preferred papers are plain and treated papers which may have an acid, alkaline or neutral character.

Especially preferred substrates include overhead projector slides, plain and treated papers and synthetic or semi-synthetic textile materials, for example a polyester.

The preferred ink compositions used in the process is as hereinbefore described.

According to a fifth aspect of the present invention there is provided a paper, an overhead projector slide or a textile material printed with an ink composition according to the first, second or third aspects of the present invention or by means of the process according to the fourth aspect of the present invention.

According to a sixth aspect of the present invention there is provided a process for the coloration of a textile material with any of the ink compositions according to the first, second or third aspects of the present invention which comprises the steps:
i) applying the ink composition to the textile material by ink jet printing; and
ii) heating the textile material at a temperature from 50° C. to 250° C. to fix the dye on the material.

The process for coloration of a textile material by ink jet printing preferably comprises a pre-treatment of the textile material with an aqueous pretreatment composition comprising a water-soluble acid and a thickening agent followed by removing water from the pre-treated textile material to give a dry pre-treated textile material which is subjected to ink jet printing in step i) above.

The pre-treatment composition preferably comprises a solution of the acid in water containing the thickening agent.

The acid is present in the pretreatment composition to provide a pH of less than 7, preferably a pH in the range of 2 to 6, on the surface of the fabric. The acidic medium on the surface of the fabric ensures that the dye chromophore is not decomposed during the dyeing process, as can be the case if the pH exceeds 7. It is preferred that the acid is a non volatile acid, more preferably a non volatile organic acid, for example, citric acid or tartaric acid. The acid is present in the pre-treatment composition at a concentration sufficient to give a pH in the range of 2 to 6. When the acid is citric or tartaric acid it is convenient to use a concentration of from 1% to 5% based upon the total weight of the pre-treament composition.

The thickening agent may be any thickening agent suitable for use in the preparation of print pastes for the conventional printing of cellulose reactive dyes. Suitable thickening agents include alginates, especially sodium alginate, xantham gums, monogalactam thickeners, polysaccharides and cellulosic thickeners. The amount of the thickening agent can vary within wide limits depending on the relationship between concentration and viscosity. However, sufficient agent is preferred to give a viscosity from 10 to 1000 mPa.s, preferably from 10 to 100 mpa.s, (measured on a Brookfield RVF Viscometer). For an alginate thickener this range can be provided by using from 10% to 20% by weight based on the total weight of the pretreatment composition.

The remainder of the pretreatment composition is preferably water, but other ingredients may be added to aid fixation of the dye to the textile material or to enhance the clarity of print by inhibiting the diffusion (migration) of dye from coloured areas to non-coloured areas before fixation.

Examples of fixation enhancing agents are cationic polymers, such as a 50% aqueous solution of a dicyanamide/phenol formaldehyde/ammonium chloride condensate e.g. MATEXIL™ FC-PN (available from ICI), which have a strong affinity for the textile material and the dye.

Examples of anti-migration agents are low molecular weight acrylic resins, e.g. polyacrylates, such as poly(acrylic acid) and poly(vinyl acrylate).

In the pre-treatment stage of the present process the pre-treatment composition is preferably evenly applied to the textile material. Where a deeply penetrated print or a deep shade is required the pre-treatment composition is preferably applied by a padding or similar process so that it is evenly distributed throughout the material. However, where only a superficial print is required the pretreatment composition can be applied to the surface of the textile material by a printing procedure, such as screen or roller printing, ink jet printing or bar application.

In the pre-treatment stage of the present process, water may be removed from the pre-treated textile material by any suitable drying procedure such as by exposure to hot air or direct heating, e.g. by infra-red radiation, or micro-wave radiation, preferably so that the temperature of the material does not exceed 100° C.

The application of the ink composition to the textile material, stage (i) of the present process, may be effected by any ink jet printing technique, whether drop on demand (DOD) or continuous flow. Where the ink jet printing technique involves the charging and electrically-controlled deflection of drops the composition preferably also contains a conducting material such as an ionised salt to enhance and stabilise the charge applied to the drops. Suitable salts for this purpose are alkali metal salts of mineral acids.

After application of the ink composition, it is generally desirable to remove water from the printed textile material at relatively low temperatures (<100° C.) prior to the heat applied to fix the dye on the textile material as this has been found to minimise the diffusion of the dye from printed to non-printed regions. As with the pretreated textile material removal of water is preferably by heat, such as by exposure to hot air or to infra-red or micro-wave radiation.

In stage (ii) of the present process, the printed textile material is submitted to a short heat treatment, preferably after removal of water by low-temperature drying, at a temperature from 100° C. to 200° C. by exposure to dry or steam heat for a period of up to 20 minutes in order to fix the dye on the textile material. If a steam (wet) heat treatment is used, the printed material is preferably maintained at 100°–105° C. for from 5 to 15 minutes whereas if a dry heat treatment is employed the printed material is preferably maintained at 140°–160° C. for from 2 to 8 minutes.

After allowing the textile material to cool, unfixed dye and other ingredients of the pretreatment and dye compositions may be removed from the textile material by a washing sequence, involving a series of hot and cold washes in water and aqueous detergent solutions before the textile material is dried.

Preferred textile materials for use in the process according to the sixth aspect of the present invention are as hereinbefore defined for the fourth aspect of the present invention.

According to a seventh aspect of the present invention there is provided a textile material, especially a synthetic or semisynthetic textile material, coloured an by means of the process according to the sixth aspect of the present invention.

According to an eighth aspect of the present invention there is provided a toner resin composition comprising a toner resin and a dye, characterised in that the dye is of Formula (1), a mixture of dyes of Formulae (1) and (4) or a mixture of dyes of Formulae (1) and (5).

The toner resin is preferably a thermoplastic resin for example, a styrene or substituted styrene polymer or copolymer, for example, a polystyrene or styrene-butadiene copolymer, especially a styrene-acrylic copolymer, for example, a styrene-butyl methacrylate copolymer. Other suitable toner resins include polyesters, polyvinylacetate, polyalkenes, polyvinylchloride, polyurethanes, polyamides, silicones, epoxyresins and phenolic resins. Examples of toner resins are given in Electrophotography by R. M. Scharfert (Focal Press), U.S. Pat. No. 5,143,809, UK 2090008, U.S. Pat. No. 4,206,064 and U.S. Pat. No. 4,407,928 which are incorporated herein by reference thereto.

The toner resin composition preferably contains from 0.1% to 20% of the dye of Formula (1), a mixture of dyes of Formulae (1) and (4) or mixture of dyes of Formulae (1) and (5), more preferably from 3% to 10% based on the total weight of the toner resin composition.

The toner resin composition may be prepared by any method known to the art which typically involves mixing the toner resin with an optional charge control agent (CCA) and the dye of Formula (1) a mixtures of dyes of Formulae (1) and (4) or a mixture of dyes of Formulae (1) and (5), by kneading in a ball mill above the melting point of the resin.

Generally, this involves mixing the molten toner resin composition for several hours at temperatures from 120° to 200° C., in order to uniformly distribute the optional CCA and dye throughout the toner resin. The toner resin is then cooled, crushed and micronised until the mean diameter of the particles is preferably below 20 μm and, for high resolution electro-reprography, more preferably from 1 to 10 μm. The powdered toner resin composition so obtained may be used directly or may be diluted with an inert solid diluent such as fine silica by mixing for example in a suitable blending machine.

It is preferred that when a CCA is present in the toner, it is present at from 0.1 to 5% based upon the total weight of the toner.

The CCA may be any known positive or negative charge control agent. Examples of negative charge control agents include metal complexes of azo dyes, preferably 2:1 complexes with chromium (III), cobalt (III) and iron (III). Preferred azo dyes are 1-phenylazo-2-naphthol dyes. Examples of positive CCA's include nigrosine dyes, phenazines, triphenylmethane dyes, 2:1 chromium complexes of an aromatic orthohydroxy carboxylic acid such as BONTRON™ E81 and BONTRON™ E82 (commercially available from Orient Chemical Industries) and alkyl pyridinium halides such as cetyl pyridinium chloride. It is preferred that the CCA used in the toner is colourless or substantially colourless such that the colour of the toner is not markedly effected by the presence of the CCA.

Further suitable examples of CCA's are described in WO 94/23344 which is incorporated herein by reference thereto.

The invention is further illustrated by the following Examples in which all parts and percentages are by weight unless otherwise stated.

EXAMPLE 1

Preparation of:

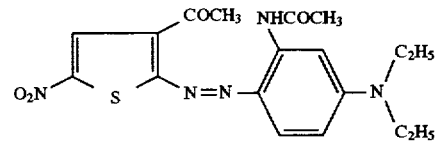

Sodium nitrite (3.22 g) was added to concentrated sulphuric acid (20 cm$^3$) and the mixture heated to 70° C. and then cooled to 5° C. Further concentrated sulphuric acid (15 cm$^3$) was added followed by (25 cm$^3$) of a 86:14 mixture of acetic acid and propionic acid. 2-Amino-3-acetyl-5-nitrothiophene (8.5 g) was then added slowly below 0° C. and the mixture stirred at −2° C. to 0° C. for 2 hours and then 0° C. to 2° C. for 3 hours when diazotisation was complete. The solution was then added to a mixture of 3-N,N-diethylaminoacetanilide (10.3 g), methanol (75 cm$^3$), crushed ice (180 g) and sulphamic acid (1.0 g). The temperature was maintained at 0°–5° C. and the pH at 1–2 by the addition of sodium acetate solution. The mixture was stirred at 0°–5° C. for 2 hours and then the product was isolated by filtration and washed with water. Yield after drying 12.9 g.

EXAMPLES 2 to 15

Dyes of the formula:

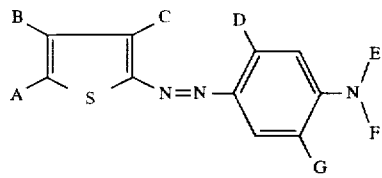

wherein the substituents A to G are shown in Table 1 may be prepared using an analogous process to that described in Example 1.

TABLE 1

| Eg | A | B | C | D | E | F | G |
|----|---|---|---|---|---|---|---|
| 2  | —$NO_2$ | H | —$COCH_3$ | —$CH_3$ | —$C_2H_5$ | —$(CH_2)_4OCOCH_3$ | H |
| 3  | —$NO_2$ | H | —$COCH_3$ | —$NHCOCH_3$ | —$C_2H_5$ | —$(CH_2)_4OCOCH_3$ | H |
| 4  | —$NO_2$ | H | —$COCH_3$ | —$NHCOCH_3$ | —$C_2H_5$ | —$C_2H_4OH$ | H |
| 5  | —$NO_2$ | H | —$COC_2H_5$ | —$NHCOCH_3$ | —$C_2H_4OH$ | —$C_2H_4OH$ | H |
| 6  | —$NO_2$ | H | —$COC_2H_4OH$ | —$NHCOC_2H_5$ | —$C_2H_5$ | —$C_2H_5$ | H |
| 7  | —$NO_2$ | H | —$COCH_3$ | —$NHCOCH_3$ | —$C_2H_4OCH_3$ | —$C_2H_5$ | H |
| 8  | —$NO_2$ | H | —$COCH_3$ | —$NHCOCH_3$ | —$C_2H_4OCOCH_3$ | —$C_2H_4OCOCH_3$ | H |
| 9  | —$NO_2$ | H | —$COCH_3$ | —$CH_3$ | —$C_2H_5$ | —$(CH_2)_4OCOCH_3$ | —$CH_3$ |
| 10 | —$NO_2$ | H | —$NO_2$ | —$NHCOCH_3$ | —$C_2H_5$ | —$C_2H_5$ | H |
| 11 | —$NO_2$ | H | —$COCH_3$ | —$CH_3$ | —$C_2H_5$ | —$(CH_2)_2OCOCH_3$ | H |
| 12 | —$NO_2$ | H | —$COCH_3$ | —$OCH_3$ | —$C_2H_4OH$ | —$C_2H_4OH$ | —$OCH_3$ |
| 13 | H | —CN | —$COCH_3$ | —$NHCOCH_3$ | —$C_2H_5$ | —$C_2H_5$ | H |
| 14 | —$NO_2$ | H | —$COCH_3$ | —$NHCOCH_3$ | —$C_2H_5$ | —$C_2H_5$ | —$CH_3$ |
| 15 | —$NO_2$ | H | —$NO_2$ | H | —$C_2H_4OCOCH_3$ | —$C_2H_4OCOCH_3$ | H |

EXAMPLES 16 to 21

Dyes of Formula (5) with the substituents $R^9$ to $R^{15}$ shown in Table 2 may be prepared by diazotising the aniline of formula:

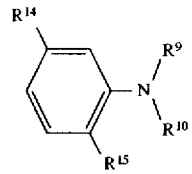

TABLE 2

| Eg | $R^9$ | $R^{10}$ | $R^{11}$ | $R^{12}$ | $R^{13}$ | $R^{14}$ | $R^{15}$ |
|----|-------|----------|----------|----------|----------|----------|----------|
| 16 | —$C_2H_5$ | —$C_2H_5$ | —$NO_2$ | —$NO_2$ | —CN | —$CH_3$ | H |
| 17 | —$C_2H_5$ | —$(CH_2)_4OCOCH_3$ | —Br | —CN | —Cl | —$CH_3$ | —$CH_3$ |
| 18 | —$C_2H_5$ | —$C_2H_5$ | —CN | —CN | —$NO_2$ | H | —$OCH_3$ |
| 19 | —$C_2H_4OH$ | —$C_2H_5$ | —H | —$NO_2$ | —CN | —$OCH_3$ | —$OCH_3$ |
| 20 | —$C_2H_4OH$ | —$C_2H_4OH$ | —CN | —$NO_2$ | —CN | —$CH_3$ | H |
| 21 | —$C_2H_5$ | —$C_2H_5$ | —CN | —$NO_2$ | —Br | —$NHCOCH_3$ | H |

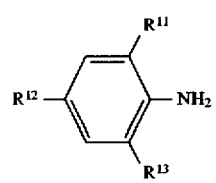

and coupling the diazo salt with the compound of the formula:

EXAMPLE 22

The following ink compositions containing the dyes and mixtures thereof, described in the previous examples may be prepared according to the formulations shown in Table 3 wherein the figures denote parts by weight based upon the total weight of the ink composition.

In Table 3 Formulations A and B refer to the following ink media wherein the parts are by weight based upon the total weight of the ink composition.

| Formulation A | |
|---|---|
| Glycerol | 10.0 parts; |
| 2-pyrrolidone | 5.0 parts; |
| Nonanol (defoaming agent) | 0.5 parts; |
| Lignosulphonate (dispersing agent) | 5.0 parts; and |
| Proxel ™ GXL (a biocide available from Zeneca Limited) | 0.1 parts |
| Formulation B | |
| Ethylene glycol | 10.0 parts; |
| N-methylpyrrolidone | 5.0 parts |
| Sodium Dispersol (a dispersing agent available from Zeneca Limited) | 5.0 parts; |
| Proxel ™ GXL (a biocide available from Zeneca Limited) | 0.1 parts; and |
| Nonanol | 0.5 parts |

Each ink composition shown in Table 3 has 100 parts, the balance being water (i.e. 100—dye parts—formulation parts).

The ink compositions shown in Table 3 may be applied to a substrate such as paper using an ink jet printer.

TABLE 3

| Dye(s) from Example(s) | No. Parts of Dye(s) | Formulation | Balance of water (parts) |
|---|---|---|---|
| 1 | 5 | A | 74.4 |
| 1 | 10 | A | 69.4 |
| 1 | 2 | B | 77.4 |
| 1 | 5 | B | 74.4 |
| 1 | 8 | B | 71.4 |
| 1 (50%) 16 (50%) | 5 | A | 74.4 |
| 1 (50%) 20 (40%) | 6 | A | 73.4 |
| 1 (65%) 21 (35%) | 3 | B | 76.4 |
| 2 (50%) 1 (50%) | 2.5 | A | 76.9 |
| 1 (55%) 3 (45%) | 8.9 | B | 70.5 |
| 1 (70%) 6 (30%) | 10.0 | A | 69.4 |
| 1 (80%) 4 (20%) | 1.5 | A | 77.9 |
| 1 (90%) 10 (10%) | 3.6 | B | 75.8 |
| 1 (77%) 14 (23%) | 7.0 | A | 72.4 |

When a mixture of dyes is used in the ink formulation, the weight ratio of the dyes in the mixture is shown in brackets in Table 3 in the column marked "Dye(s) from Example(s) of Table 3". Thus the mixture 1 (50%), 16 (50%) refers to a 50:50 mixture of the dye from Example 1 and the dye from Example 16.

We claim:

1. An ink composition comprising:

(i) a medium comprising component (a), (b) or (c):
      (a) a low melting point solid;
      (b) an organic solvent selected from ketones, alkanols, esters, ethers, amides, and a mixture of an aliphatic hydrocarbon and a polar solvent;
      (c) a mixture of water and one or more water-soluble organic solvents(s), wherein the weight ratio of water to water-soluble organic solvent is from 99:1 to 50:50; and (ii) an azothiophene of Formula (1):

Formula (1)

wherein:
R, $R^1$, $R^2$ and $R^3$ each independently is optionally substituted alkyl or alkenyl.

2. An ink according to claim 1 wherein R, $R^1$, $R^2$ and $R^3$ each independently is alkyl or alkenyl.

3. An ink composition comprising:

(i) a medium as defined in claim 1; and p1 (ii) a mixture of dyes comprising an azothiophene of Formula (1) as defined in claim 1 and an azothiophene of Formula (4):

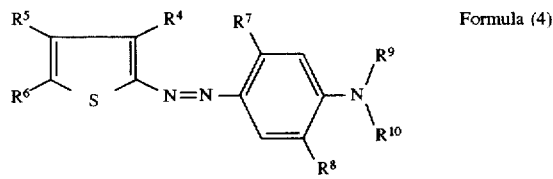

Formula (4)

wherein:
$R^4$ is —CN, —Cl, —Br, —NO$_2$, $C_{1-4}$-alkylcarbonyl, phenylcarbonyl, $C_{1-4}$-alkylsulphonyl, —COC$_{1-4}$-alkyl, —CONH$_2$, —CONH(C$_{1-4}$-alkyl) or —CON(C$_{1-4}$-alkyl)$_2$;
$R^5$ is —H, $C_{1-4}$-alkyl, phenyl or —COC$_{1-4}$-alkyl;
$R^6$ is —H, $C_{1-4}$-alkyl, phenyl, NO$_2$, —CN, —Cl, —Br, —COC$_{1-4}$-alkyl, —CONH$_2$, —CONH(C$_{1-4}$-alkyl) or —CON(C$_{1-4}$-alkyl)$_2$;
$R^7$ is —H, $C_{1-4}$-alkyl, $C_{1-4}$-alkoxy, —Cl, —Br, —NHCOC$_{1-4}$-alkyl or —NHSO$_2$C$_{1-4}$-alkyl;
$R^8$ is —H, $C_{1-4}$-alkyl or $C_{1-4}$-alkoxy; and
$R^9$ and $R^{10}$ each independently is —H, $C_{1-4}$-alkyl, $C_{2-4}$-alkenyl or $C_{1-4}$-alkyl substituted by —OH, $C_{1-4}$-alkoxy, —CN, phenyl, $C_{1-4}$-alkylCO—, $C_{1-4}$-alkoxyCO—, HOC$_{1-4}$-alkoxy, $C_{1-4}$-alkoxy-$C_{1-4}$-alkoxy, $C_{1-4}$-alkoxy-$C_{1-4}$-alkoxyCO—, —Cl or $C_{1-4}$-alkoxyCOO.

4. An ink composition comprising: p1 (i) a medium comprising a low melting point solid, an organic solvent,or a mixture of water and one or more water-soluble organic solvent(s); and p1 (ii) a mixture of dyes comprising an azothiophene of Formula (b 1) as defined in claim 1 and an azo compound of Formula (5):

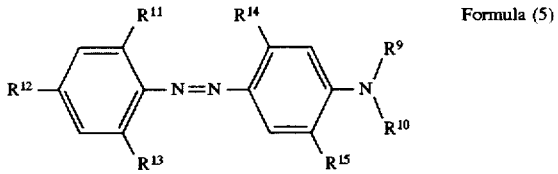

Formula (5)

wherein:
$R^{11}$, $R^{12}$ and $R^{13}$ each independently is —CN, —NO$_2$, —Cl or —Br;
$R^{14}$ is —H, $C_{1-4}$-alkyl, —Cl, —Br, —NHCOC$_{1-4}$-alkyl or —NHSO$_2$C$_{1-4}$-alkyl;
$R^{15}$ —H, $C_{1-4}$-alkyl or $C_{1-4}$-alkoxy; p2 $R^9$ and $R^{10}$ each independently is —H, $C_{1-4}$-alkyl, $C_{2-4}$-alkenyl or $C_{1-4}$-alkyl substituted by —OH, $C_{1-4}$-alkoxy, —CN, phenyl, $C_{1-4}$-alkylCO—, $C_{1-4}$-alkoxyCO—, HOC$_{1-4}$-alkoxy, $C_{1-4}$-alkoxy-$C_{1-4}$-alkoxy, $C_{1-4}$-alkoxy-$C_{1-4}$-alkoxyCO—, —Cl or $C_{1-4}$-alkoxyCOO.

5. An ink composition according to any one of claims 1 to 4 wherein the medium comprises water and one or more water-soluble organic solvent(s), wherein the weight ratio of water to water-soluble organic solvent is from 99:1 to 50:50.

6. An ink composition according to any one of claims 1 to 4 comprising:

(a) 0.5 to 20 parts of the dye(s);

(b) 2 to 60 parts of water-soluble organic solvent(s);

(c) 1 to 95 parts water;

(d) 0.5 to 20 parts dispersing agent; and (e) 0.05 to 2 parts defoamer;

wherein the parts (a)+(b)+(c)+(d)+(e)=100.

7. An ink composition according to any one claims 1 to 4 wherein the ink composition has a pH of less than 7.

8. An ink jet printing process for printing a substrate with an ink composition comprising forming the ink into small droplets by ejection from a reservoir through a small orifice so that the droplets of ink are directed at the substrate wherein the ink composition comprises: p1 (i) a medium comprising a low melting point solid, an organic solvent, or a mixture of water and one or more water-soluble organic solvent(s); and p1 (ii) a dye or mixture of dyes as defined in any one of claims 1 to 4.

9. A paper, an overhead projector slide or a textile material printed by means of the process according to claim 8.

10. A process for the coloration of a textile material with an ink composition which comprises the steps:

i) applying the ink composition to the textile material by ink jet printing, and ii) heating the textile material at a temperature from 50° C. to 250° C. to fix the dye on the material, wherein the ink composition comprises:

(a) a medium comprising a low melting point solid, an organic solvent, or a mixture of water and one or more water-soluble organic solvent(s); and (b) a dye or mixture of dyes as defined in any one of claims 1 to 4.

11. A textile material coloured by means of the process according to claim 10.

12. A toner resin composition comprising a toner resin and a dye, wherein the dye is of Formula (1), a mixture of dyes of Formulae (1) and (4), or a mixture of dyes of Formulae (1) and (5), wherein said dyes are as defined in any one of claims 1 to 4.

13. An ink composition according to claim 4 wherein the medium comprises water and one or more water-soluble organic solvent(s).

* * * * *